United States Patent [19]

Lo

[11] Patent Number: 4,877,393

[45] Date of Patent: Oct. 31, 1989

[54] APPARATUS FOR PRODUCING BIAXIALLY ORIENTED POLYMER SHEET

[75] Inventor: Ying-Cheng Lo, Bethlehem, Pa.

[73] Assignee: Aluminum Company of America, Alcoa Center, Pa.

[21] Appl. No.: 277,815

[22] Filed: Nov. 30, 1988

Related U.S. Application Data

[62] Division of Ser. No. 806,994, Dec. 9, 1985, Pat. No. 4,789,514.

[51] Int. Cl.$^4$ .................. B29C 43/48; B29C 47/54
[52] U.S. Cl. .................................. 425/383; 425/327; 425/371; 425/377; 425/380; 425/461
[58] Field of Search ............. 264/175, 177.16, 177.17, 264/280, 323; 425/363, 461, 383, 170, 380, 377, 133.5, 325, 327, 371, 466, 446, 376.1

[56] References Cited

U.S. PATENT DOCUMENTS

| | | | |
|---|---|---|---|
| 1,821,552 | 9/1931 | Kirschbraun | 264/175 X |
| 1,952,038 | 3/1934 | Fischer | 264/177.17 X |
| 2,611,150 | 9/1952 | Goulding, Jr. | 425/170 X |
| 2,732,591 | 1/1956 | Whittum | 425/363 X |
| 3,354,023 | 11/1967 | Dunnington et al. | 264/175 X |
| 3,478,138 | 11/1969 | Friesner | 264/175 X |
| 3,499,957 | 3/1970 | Ancker | 264/175 |
| 4,151,245 | 4/1979 | Suzuki | 264/280 |
| 4,235,834 | 11/1980 | Vetter et al. | 264/280 X |
| 4,282,277 | 8/1981 | Austen et al. | 264/570 X |
| 4,596,523 | 6/1986 | Whitehead | 425/363 X |

FOREIGN PATENT DOCUMENTS 577185 6/1959 Canada .................. 264/280

Primary Examiner—Richard L. Chiesa
Attorney, Agent, or Firm—Millen, White & Zelano

[57] ABSTRACT

In accordance with the apparatus for practicing the instant invention, biaxially oriented polymer sheet is produced by flowing and advancing a polymer workpiece between pairs of opposed working surfaces which converge in the "X" direction while diverging in the "Y" direction. The surfaces which converge in the "X" direction are provided with protruding working surfaces which squeeze the workpiece laterally as the workpiece advances longitudinally. The protruding working surfaces force the material of the workpiece to expand to the full width of the working surfaces while minimizing limitations due to friction between the surfaces of the die and the workpiece. In accordance with a first embodiment of the invention, the apparatus utilizes an extrusion die to effect the transformation of stock into flat sheet polymer material. In accordance with a second embodiment of the invention, the apparatus and process utilize a pair of opposed belts supported by convex rollers to effect the transformation of stock into sheet. The sheet produced by the process and apparatus has uniform strain distribution over the width thereof and through the thickness thereof.

7 Claims, 5 Drawing Sheets

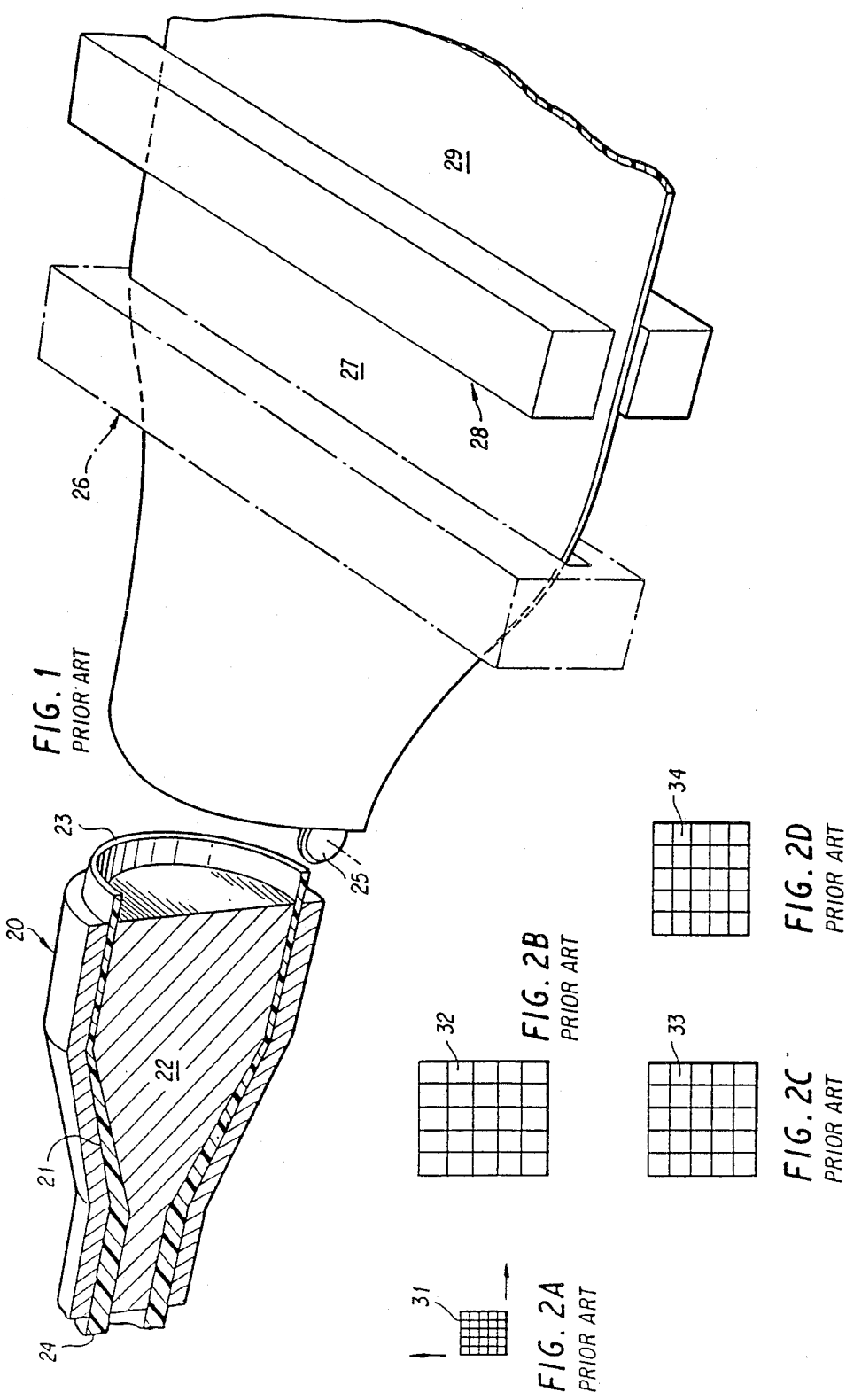

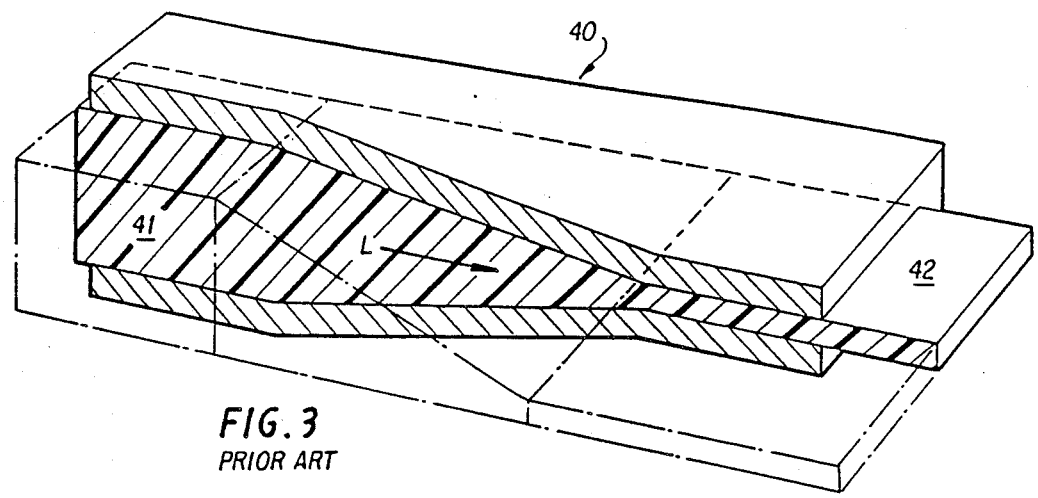
FIG. 3
PRIOR ART
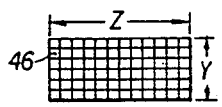  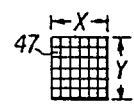
FIG. 4A
PRIOR ART
FIG. 4B
PRIOR ART
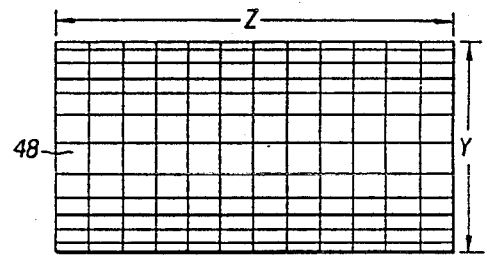  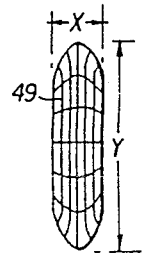
FIG. 4C
PRIOR ART
FIG. 4D
PRIOR ART
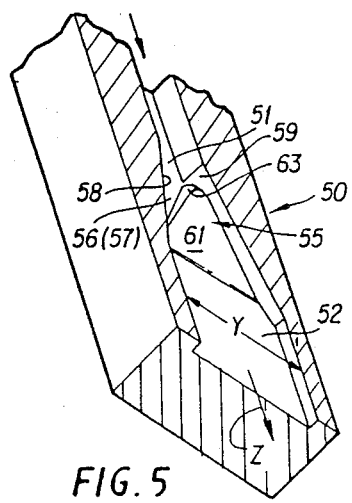  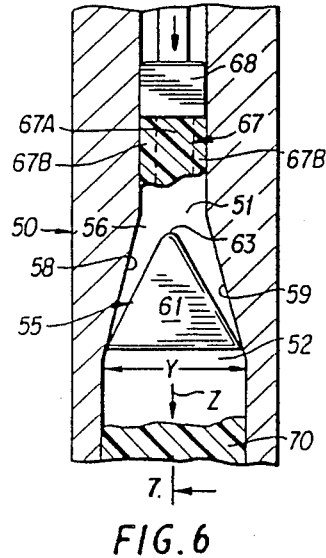  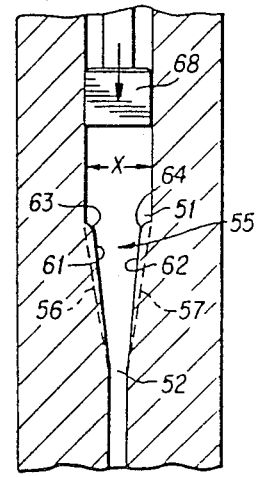
FIG. 5
FIG. 6
FIG. 7

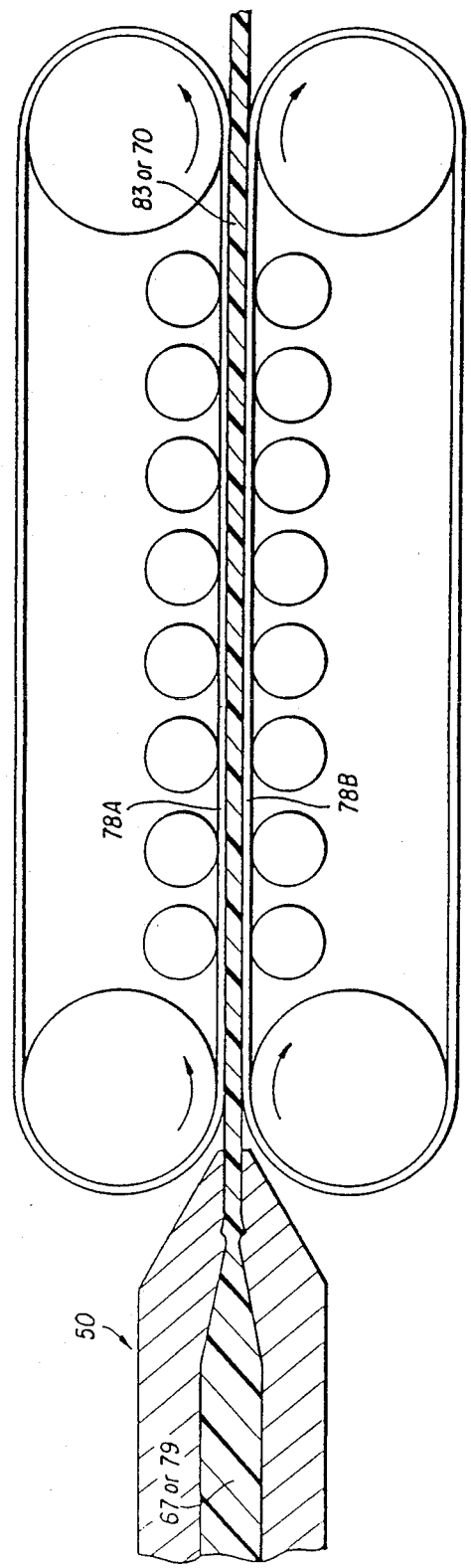
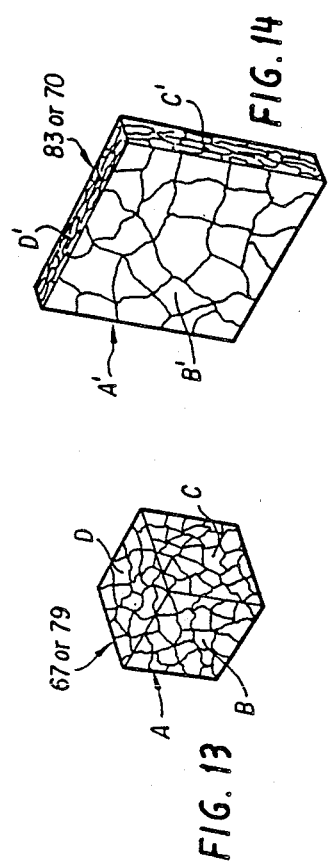
FIG. 12
FIG. 13
FIG. 14

APPARATUS FOR PRODUCING BIAXIALLY ORIENTED POLYMER SHEET

RELATED PATENT APPLICATIONS

The instant application is a divisional application of application Ser. No. 806,994, filed Dec. 9, 1985, now U.S. Pat. No. 4,789,514.

BACKGROUND OF THE INVENTION

1. Field of the Invention

The instant invention relates to methods of and apparatus for producing flat, biaxially oriented, polymer sheet. More particularly, the instant invention relates to methods of and apparatus for producing flat, biaxially oriented, polymer sheet, wherein the sheet has substantially uniform strain distribution through the thickness of the sheet.

2. Technical Considerations and Prior Art

Polypropylene polymers, such as those sold under the trademark BEXOR, have numerous advantages over unoriented polymers in that they have higher strength, improved stiffness, increased toughness and easier thermoformability. However, for several reasons it has proved relatively difficult to produce sheets of polypropylene materials by solid state extrusion processes which retain this flatness when heated for forming. This is because orientation of polymers through the thickness of sheets produced by solid state extrusion is not uniform causing the sheets to curve and buckle, resulting in difficulties in handling the sheets when preheated for forming. During solid state extrusion, it is necessary to apply compensation pressure to balance extrusion pressures. This requires complex, expensive machinery. Moreover, since the polymer material cannot be quenched soon after extrusion, it is very difficult to biaxially orient amorphous polymers in compression.

U.S. Pat. No. 4,282,277, assigned to the assignee of the instant invention, discloses using a mandrel in combination with a conical die to produce a tubular product. The tubular product is then cut, flattened and annealed utilizing expensive flattening and annealing equipment. While the mandrel—conical die approach results in relatively good biaxial orientation of structures, it is necessary to expend considerable effort to remove the curvature of the resulting product. Even when the curvature has been removed by reconfiguring the extruded tube into a flat sheet, there are residual stresses and strains which tend to subsequently assert themselves, resulting in latent difficulties when using the product.

Attempts have been made to extrude high density polyethylene while in the solid state utilizing dies with flat inner surfaces which converge in a first transverse direction and diverge in a second transverse direction normal to the first transverse direction. However, it has been found that the material extrudes non-uniformly due to friction between the specimen and the die which prevents the top and bottom surfaces of the material from extending to the two diverging sides of the die. In specimens produced with flat dies, the sides of the surfaces bulge due to surface friction. With the exception of the center of the extrudate, there is considerable distortion in the extrudate resulting in non-uniform sheet material which cannot be used for most applications.

SUMMARY OF THE INVENTION

It is an object of the instant invention to provide new and improved biaxially oriented polymer sheet and to provide new and improved methods of and apparatus for producing biaxially oriented polymer sheet, wherein the sheet has both substantially uniform strain distribution and uniform properties throughout the thickness and width thereof.

Upon further study of the specification and appended claims, further objects and advantages of this invention will become apparent to those skilled in the art.

The instant invention contemplates methods of and apparatus for producing biaxially oriented polymer sheet from a workpiece of polymer by flowing the material of the workpiece between working surfaces in a longitudinal direction while simultaneously squeezing the material in a first lateral direction and flowing the material in a second lateral direction, normal to the first lateral direction. In order to provide uniform strain over the width of the sheet and through the thickness of the sheet, the material of the workpiece proximate the center portion thereof is squeezed in a manner to compensate for the friction between the material and working surface.

In accordance with a first embodiment of the invention, the working surfaces are the opposed internal surfaces of a die which converge in a first lateral direction to squeeze the material of the workpiece and diverge in a second lateral direction to allow spreading of the material displaced by squeezing the material in the first lateral direction. The opposed surfaces which squeeze the material of the workpiece include protrusions thereon which extend from the working surfaces of the die in the first lateral direction.

In accordance with a second embodiment of the invention, the working surfaces are a pair of opposed belts supported by and configured by a series of opposed convex rollers which decrease in convexity in the direction of longitudinal material flow.

The invention further contemplates a biaxially oriented sheet of radially compressed, discrete, plate-like, spherulitic, crystilline aggregates with strain uniformly distributed throughout the sheet.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 is a schematic representation of a prior art arrangement utilizing a mandrel and a conical die in combination with flattening and annealing equipment to produce high density polyethylene sheet in accordance prior art processes;

FIGS. 2(A), (B), (C) and (D) are inscribed grids illustrating deformation of material of a high density polyethylene billet due to extruding the billet through the mandrel and conical die of FIG. 1; wherein FIG. 2(A) illustrates the grids inscribed on inner, outer and intermediate surfaces of a workpiece prior to deformation; FIG. 2(B) shows the deformed grid on the inner surface of the cylindrical sheet after extrusion; FIG. 2(C) shows the deformed grid on an intermediate surface of the cylindrical sheet after extrusion, and FIG. 2(D) shows the deformed grid on the outer surface of the cylindrical sheet after extrusion;

FIG. 3 is a prospective view of a die in accordance with prior art practices, wherein all working surfaces of the die are flat;

FIGS. 4(A), (B), (C) and (D) are inscribed grids which show the deformation of the material used with the flat die of FIG. 3; wherein FIG. 4(A) shows a grid inscribed on the four sides of a workpiece prior to extrusion; FIG. 4(B) shown a grid inscribed on the end of the workpiece prior to extrusion; FIG. 4(C) shows the grid of FIG. 4(A) subsequent to extrusion, and FIG. 4(D) shows the grid of FIG. 4(B) subsequent to extrusion;

FIG. 5 is a perspective sectional view of a die, configured in accordance with the principles of the instant invention, wherein the die has opposed, protruding internal working surfaces (only one of which is shown) which surfaces diverge as opposed die faces of the die converge;

FIG. 6 is a top view of the die of FIG. 5;

FIG. 7 is a side section of the die of FIG. 6 taken on the long lines 7—7 of FIG. 6 showing that the opposed die faces converge;

FIG. 12 is a side view, partially in section, showing a pair of opposed belts used to hold the sheet in a flattened condition after the sheet has been formed by extruding material through the die of FIGS. 5–7;

FIG. 13 is a perspective view showing the grain structure of a workpiece prior to working in accordance with the principles of the instant invention; and FIG. 14 is a perspective view of the workpiece of FIG. 13 after it has been worked in accordance with the principles of the instant invention to provide a sheet article in accordance with the instant invention.

DETAILED DESCRIPTION OF THE DRAWINGS

FIGS. 1–4—The Prior Art

Figure 8A:
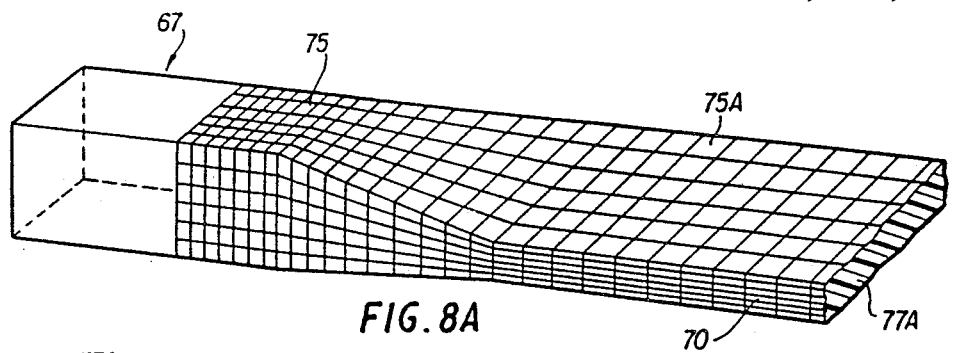
FIG. 8A is a perspective view showing a sample of the extrudent produced by the die of FIGS. 5, 6 and 7, wherein the billet from which the extrudent was formed is inscribed with the grid on the end of the billet as shown in FIG. 8B prior to extrusion, whereby the flow of material during the extrusion process results in the grid of FIG. 8C.

Referring first to FIGS. 1 through 4, in order to fully appreciate the contribution of the instant invention, it is necessary to understand the problems which the instant invention has solved. Current manufacturing techniques generally rely on apparatus such as that shown in FIG. 1 wherein an extruder, designated generally by the numeral 20, utilizes a die 21 and a conical mandrel 22 to produce a cylindrical workpiece 23 from a billet 24. The cylindrical workpiece 23 is then slit by a cutting blade 25, flattened by flattening apparatus 26 and annealed by an annealing apparatus 28 to produce a flat sheet 29 which is relatively free of residual stress and strain. The flat sheet 29 still has some residual stress therein, which stress after a period of time may cause the sheet to deform, especially when the sheet is subjected to temperatures above normal ambient temperatures. However, for many applications, the sheet is quite adequate.

In order to understand the disadvantages of the cylindrical workpiece 23 produced by the extruder 20, reference may be had to FIGS. 2(A)–(D) wherein deformation of three grids 31 (FIG. 2A) initially inscribed on inner, outer and intermediate surfaces of the billet 24 are illustrated subsequent to extrusion by grids 32, 33 and 34 of FIGS. 2(B)–2(D). The grid pattern after extrusion is not uniform through the thickness of the extruded sheet 29. As will be explained hereinafter, in accordance with the instant invention as set forth in FIGS. 5–14, grid patterns substantially uniform through the thickness of the sheet are achieved in flat, high density polyethylene or polypropylene sheet taken directly from process apparatus without the need for cutting and flattening an intermediate cylindrical workpiece such as the workpiece 23.

If one were to simply use a die with flat working surfaces, such as the die, designated generally by the numeral 40, shown in FIG. 3, to extrude a billet 41 into a sheet 42, the resulting sheet 42 would exhibit considerable distortion, rendering it virtually useless for commercial applications. This distortion results from the structure of high density polyethylene not being uniformly biaxially oriented. As is seen in FIGS. 4(A), (B), (C) and (D), when one inscribes a uniform grid 46 on the top of the billet 41, and a uniform grid 47 on the face of the billet, the resulting extruded sheet 47 has distortions as are demonstrated by non-uniform top the grid 48 of FIG. 4(C) and the non-uniform face grid 49 of FIG. 4(D). Accordingly, simply using flat dies for extruding materials such as high density polyethylene is not a viable alternative to the process and apparatus illustrated in FIG. 1.

FIGS. 5–8 Die Configuration and Extrusion Process

Referring now to FIGS. 5, 6 and 7, there is shown an extruder die, designated generally by the numeral 50, configured in accordance with the principles of the instant invention. The extruder die 50 has an upstream inlet end 51 and a downstream outlet end 52. Disposed between the inlet end 51 and the outlet end 52 of the die 50 there is a working portion, designated generally the numeral 55. The working portion 55 provides the die faces which form the working surfaces of the die 50, which working surfaces are embodied in opposed first and second surfaces 56 and 57 and opposed third and fourth surfaces 58 and 59. The opposed first and second surfaces 56 and 57 include opposed convex protrusions 61 and 62 which extend into the interior space of the die. The convex protrusions 61 and 62 each diverge in the "Y" direction and converge in the "X" direction from respective apices 63 and 64 as the first and second surfaces 58 and 59 diverge.

When a workpiece in the form of a billet, designated generally by the numeral 67, of polyethylene is pushed by a piston 68, or some other instrumentality, into engagement with the die faces 56, 57, 58, 59, 61 and 62 the material of the billet is squeezed in the "X" direction and flows both downstream in the "Z" direction and laterally in the "Y" direction, resulting in a flat sheet 70 of high density polyethylene emerging downstream through the outlet end 52 of the extrusion die 50. The resulting flat sheet 70 is biaxially oriented with uniform strain distribution through the thickness of the sheet. Consequently, the resulting flat sheet 70 is substantially free from distortion and therefore provides a commercially useful product.

Figures 8B, 8C:
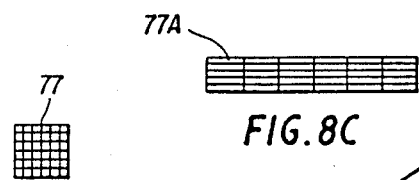

The biaxial orientation of the molecules of the flat sheet 70 extruded from the billet 67 is bourne out by the results of an experiment illustrated in FIGS. 8(A)–(C), wherein the surfaces of the billet 67 contacting the first and second die faces 56 and 57 of the die 50 were inscribed with grids 75 and the end surface 76 of the billet was inscribed with a grid 77 (FIG. 8B). Subsequent to extrusion, the grid 75 has the configuration 75(A) and the grid 77 has the configuration 77(A), as shown in FIGS. 8(B) and 8(C), respectively. As is readily seen from comparing initial grids 75 and 77 to subsequent grids 75(A) and 77(A), the scribed lines which were parallel to one another prior to extrusion remain parallel to one another subsequent to extrusion. This shows that the structure of the high density polyethylene material are biaxially and uniformly oriented.

Considering the workpiece 67 more specifically in relation to the configuration of the die 50, the workpiece 67 has inboard portions, disposed generally in the area defined by the numeral 67(A), and outboard portions, disposed generally in the areas defined by the numeral 67(B). The workpiece has a first lateral dimension extending in a first direction "X" between the die faces 56 and 57; a second lateral dimension extending in a second lateral direction "Y" between the die faces 58 and 59, and a longitudinal dimension extending in the direction "Z" normal to the "X" and "Y" directions. As the workpiece 67 is forced in the "Z" direction by piston 68, the workpiece is converted into the sheet 70 by being squeezed in the "X" direction while simultaneously flowing in the "Y" direction and "Z" direction. During the deformation, the workpiece 67 is squeezed more over the inboard portions 67(A) thereof than over the outboard portions 67(B) thereof by the protrusions 61 and 62. During working of the billet 67, the material thereof is kept above the glass transition temperature of the polymer material. The particular polymer material utilized is from the group consisting of polyethylene, high density polypropylene, polyacetal, polyethylene terephthalate and polyester. The workpiece 67 is worked while minimizing limitations due to friction between the working surfaces of the die 67 and the polymer. Accordingly, the die 50 provides apparatus to biaxially orient amorphous polymers.

As is seen in FIG. 12, in accordance with one embodiment of the invention the resulting flat sheet 70 is restrained between a pair of belts 78A and 78B as it cools so as to avoid buckling of the sheet. In the alternative, the resulting flat sheet 70 may be restrained by a pair of opposed plates.

Figure 9:
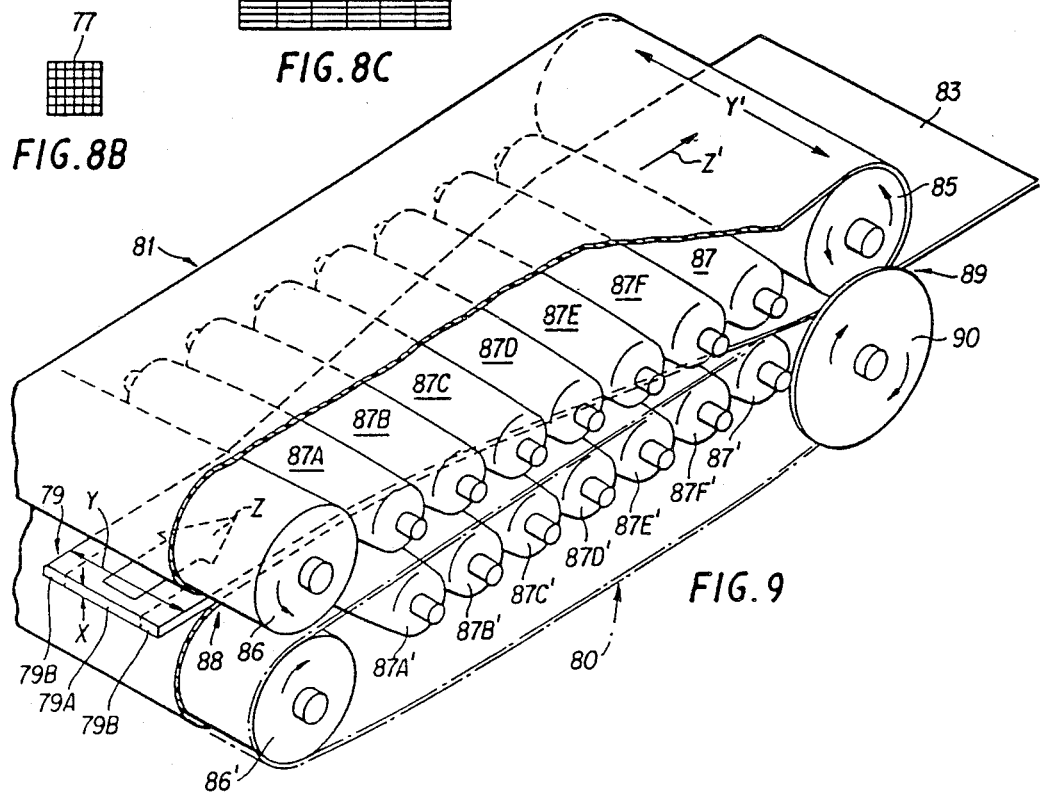
FIG. 9 is a perspective view of a second embodiment of the instant invention showing a billet being formed into a flat sheet by a pair or opposed belts supported on rollers.
Figure 10:
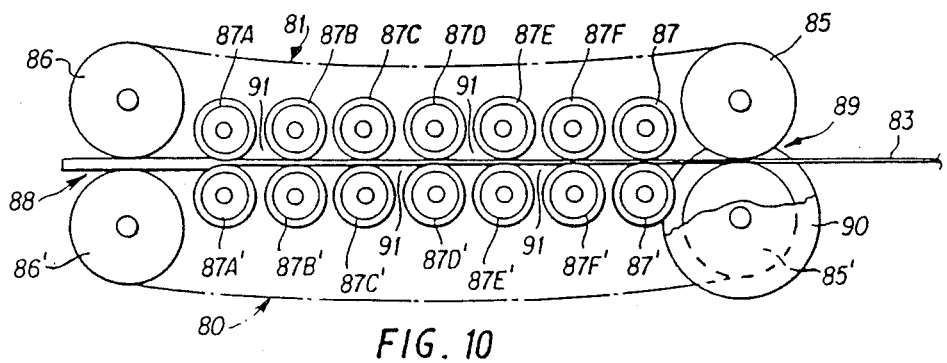
FIG. 10 is a side elevation of the second embodiment of the invention shown in FIG. 9.

FIGS. 9, 10 and 11 Continuous Sheet Processing Utilizing Pairs of Opposed Belts Supported by Rollers Referring now to FIGS. 9, 10 and 11, a second embodiment of the instant invention is set forth. A workpiece in the form of a billet, designated generally by the numeral 79, of high density polyethylene material has a first lateral dimension extending in the direction "X", a second lateral dimension extending in the direction "Y" and a longitudinal dimension, extending in the direction "Z". The billet 79 is pressed between pairs of endless belts, designated generally by the numerals 80 and 81, to produce a flat sheet 83 of the material. The endless belts 80 and 81 have working surfaces which are flexible about the Y' and Z' axes thereof. Consequently, the endless belts 80 and 81 assume the shape of the structure upon which the belts are supported. In accordance with the instant invention, the flat sheet 83 is biaxially oriented with a grid flow pattern similar to the flat sheet 70, produced by the die 50 of FIGS. 5, 6 and 7 and exemplified by the grids 75(A) and 77(A) of FIGS. 8(A) and 8(C).

Figure 11A:
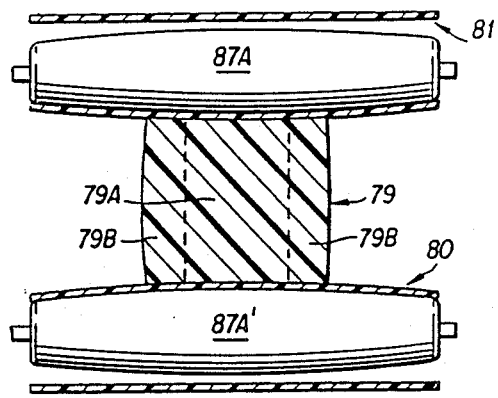
FIGS. 11(A) through 11(E) are front views of sections of the second embodiment of the invention shown in FIGS. 9 and 10, illustrating with large vertical distortion the configuration of the rollers supporting the opposed belts and the manner in which the workpiece is deformed.
Figure 11B:
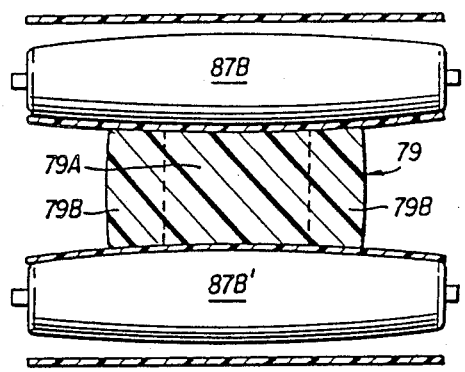
Figure 11C:
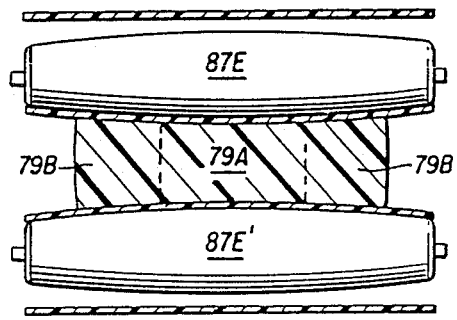
Figure 11D:
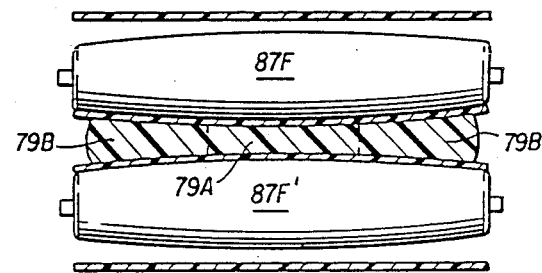
Figure 11E:
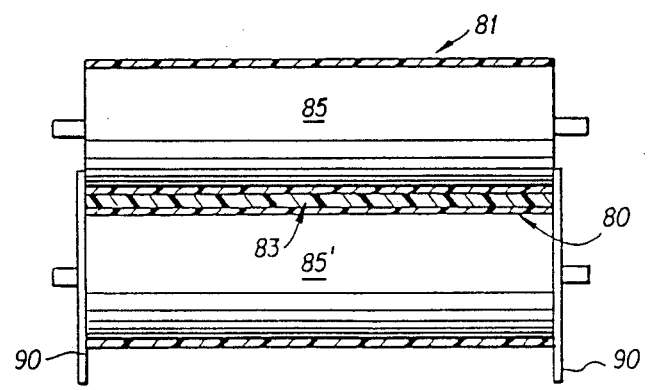

The opposed endless belts 80 and 81 are trained around a pair of opposed downstream drive rollers 85, 85' and a pair of opposed upstream rollers 86, 86'. Disposed between the downstream drive rollers 85, 85' and the upstream rollers 86, 86' are a plurality of relative small diameter, idler rollers 87 arranged in opposed pairs 87A, 87A'–87N, 87N'. The idler roller pairs 87A, 87A'–87N, 87N' are spaced relatively close together in order to minimize rebounding of the workpiece material between adjacent pairs of rollers. As is seen in FIGS. 11(A)–11(N), the idler roller pairs 87A, A'–87 N, N' decrease in convexity in the "Y" direction from an upstream, beginning position, designated generally by the numeral 88 (FIGS. 9 and 10), to a downstream end position, designated generally by the numeral 89 (FIGS. 9 and 10). The rollers of each pair of rollers 87A, A'–87N, N' are sequentially positioned closer together in the "X" direction as one progresses downstream from one roller pair to another, thereby squeezing material of the billet 79 progressively and causing the material of the billet to flow in the "Y" and "Z" directions as the billet is squeezed in the "X" direction and advances in the "Z" direction. The drive roller 86' has a flange 90 which overlaps the end of drive roller 85 so as to confine the material of the squeezed billet 79 to the area between the drive rollers 85 and 85'. For purposes of illustration, both the convexity of the rollers 87 and the thickness of the material being worked are greatly exaggerated in FIGS. 11(A)–11(E).

It is emphasized that the pair of belts 80 and 81 are tensioned with sufficient force to prevent the material of the workpiece 79 being processed from rebounding in the spaces 91 between the pairs of rollers 87A, 87A'–87N, 87N'. This is accomplished by tensioning the belts 80 and 81 sufficiently between the pair of drive rollers 85, 85' and the downstream rollers 86, 86' according to known procedures. Sufficient tensioning combined with minimal spacing between roller pairs 87A, 87A'–87N, 87N' is used to minimize rebounding of the squeezed material which has been compressed in the "X" direction.

Considering the workpiece 79 more specifically in relation to the apparatus of FIGS. 9–11; the workpiece 79 has inboard portions, disposed generally in the area defined by the numeral 79(A) and outboard portions, disposed generally in the areas defined by the numerals 79(B). The workpiece 79 has a first lateral dimension extending in a first direction "X" between the belts 80 and 81; a second lateral dimension extending in the second lateral direction "Y" normal to the first lateral direction, and a longitudinal dimension extending in the direction "Z" normal to both the "X" and "Y" directions. As the workpiece 79 is pulled in the "Z" direction by the belts, the workpiece is converted into the sheet 83 by being squeezed in the "X" direction while simultaneously flowing in the "Y" direction and "Z" direction. Due to the convexity of the rollers 87, the workpiece 79 is squeezed more over the inboard portions 79(A) thereof than over the outboard portions 79(B) thereof. During working of the billet 79, the material thereof is kept above the glass transition temperature of the polymer material. The particular polymer material utilized is from the group consisting of polyethylene, high density polypropylene, polyethylene terephthalate and polyester.

The flat sheet 83 is restrained while it cools by being held between a pair of opposed belts, such as the roller supported opposed belts 78A and 78B shown in FIG. 12 used with the extruder 50. Alternatively, a pair of opposed plates may be used.

Theoretically, the aforedescribed process and apparatus can produce flat sheet of any width. A sheet having a width of forty-eight inches can accommodate a host of existing situations for transport, storage, structures, and processing machinery. A forty-eight inch sheet may be conveniently produced from a billet or blank which is eighteen inches wide and half an inch thick Sheet width is limited only by mechanical limitations in the belt equipment. The material, which is generally sold under the trademark BEXOR, is produced as a stock material of various widths and thicknesses.

FIGS. 13 and 14 the Resulting Sheet Product

The flat sheet 70 produced by the processes and apparatus illustrated in FIGS. 5-11 and the flat sheet 83 produced by the process and apparatus of FIGS. 9-11 are substantially biaxially oriented, semi-crystalline, thermoplastic, polymer sheets which have substantially uniform strain throughout the thicknesses thereof.

In each case, the final product is characterized by having a microstructure comprised of spherulitic crystalline aggregates which are compressed transversely to the plane of the product and are biaxially oriented in the plane of the product. The product is substantially devoid of any process induced microvoids and microfibrils. The product is also characterized by having in at least a portion thereof, an improved combination of tensile impact strength and ultimate tensile strength at ambient and low temperatures; the ratio of the tensile impact strength to ultimate tensile strength (TIS/UTS) being at least fifty percent greater than that ratio determined for the same polymer composition which is biaxially oriented to the same ultimate tensile strength level by conventional solid state deformation processes, for example by blow molding. The tensile impact strength in at least a portion of the product is at least five times greater and the ultimate tensile strength is at least one and three quarters times greater than that of the unoriented polymer from which the product is made. The product retains at least the same density as the unoriented polymer and is less permeable than a product made by conventional solid state tensioning processes, such as blow molding from the same polymer composition.

The oriented, semi-crystalline, thermoplastic sheets 70 and 83 may contain up to about sixty weight percent filler material. It has in the past been very difficult, if not impossible, to orient thermoplastic material which contains substantial filling material. However, when the thermoplastic polymer contains a filler and is extruded in accordance with the present invention it is found that the thermoplastic polymer can be successfully oriented as described above and will have a structure unlike previous products substantially devoid of microvoids and microfibrils and having within the thermoplastic polymer discrete, platelet-like spherulitic crystalline aggregates oriented in the plane of the sheet.

The sheet products 70 and 83 can be used as is for structural or the like purposes, or other uses, but will in many cases be used as blanks to form final products such as, for example, solid state formed products. Many solid state formed products are so called stretch formed products where the thermoplastic polymer is formed in a die under sufficient heat and pressure to deform the thermoplastic polymer in a solid state. The properties of the final solid state stretch-formed product will depend primarily upon the extent of deformation. However, it has been found that solid state stretch formed products made from the oriented sheet blanks of the invention have superior properties compared with the properties of similar products made with unoriented thermoplastic polymer. For example, stretch formed products made from the oriented thermoplastic polymer sheet blanks of the invention will have a more uniform cross section. The superior properties of the the oriented thermoplastic polymer prevent the thermoplastic polymer from "necking" down appreciably and the resulting product is thus much more uniformly stiff and strong than would otherwise be the case. The actual properties of the stretch formed product may vary from place to place in the product depending upon the amount of work or deformation applied to any given portion of the product. Any flanges on the product, being substantially unworked, will have the superior characteristic properties as the original oriented blank. In some products this is very important as the flanges provide important structural strength and toughness. The lips or flanges around the edges of refrigerator freezer door liners, freezer food containers, pans or tote boxes are representative of this type of product. Likewise any portion of the product which is expanded less than roughly fifty percent will have essentially the same property characteristics as the original oriented blank material. Thus the properties of shallow drawn or formed articles are very superior. Beyond about fifty percent expansion the characteristic properties of the thermoplastic polymer are progressively changed due to the progressive destruction of the spherulitic crystalline aggregates and the increase in planar orientation as deformation continues. Initially, an increase in deformation increases the ultimate tensile strength while retaining at least the same tensile impact properties, but at high elongation, the properties begin to decrease Therefore, products made from the oriented blanks of the invention will usually have very significant portions which have very superior properties compared to products made from an unoriented thermoplastic polymer, filled or unfilled, of the same composition.

The structure of the sheets 70 or 83 is comprised of spherulitic crystalline aggregates which are discrete and platelet or wafer-like and have a generally polygonal shape. The aggregates are radially compressed and circumferentially and axially elongated and are planar oriented, that is, are oriented in the plane of the sheet extent. The structure is substantially free of press induced microvoids and microfibrils in the boundaries between the spherulitic crystalline aggregates and in the spherulitic crystalline aggregates.

The starting thermoplastic polymer which can be used in this invention is a substantially non-oriented semi-crystalline or crystalline homopolymer or copolymer having a crystallinity of at least forty percent, a relatively sharp crystalline melting point observed by differential thermal analysis and a structure containing long chain molecules which solidify in the form of spherulitic crystalline aggregates. The polymer can be softened and formed by heat or stress and can be molecularly oriented by drawing and stretching at a temperature between the glass transition temperature and the crystalline melting point as shown by major improvements in properties, such as ultimate tensile strength and tensile impact strength. The polymer can have a molecular weight between $10^4$ and $10^6$. Such thermoplastic polymers include orientable polyolefins, for example isotactic polypropylene, high density polyethylene; polyamides, for example nylon 6,6; polyacetals, for example polybutylene terephthalate; and polycarbonates.

By way of example only, a typical structure of a polymer, which in this instance is isotactic polypropylene used as the starting polymer forming workpieces, such as workpieces 67 or 79, is shown pictorially in FIG. 13. The structure of the sheets 70 or 83 is shown pictorially in FIG. 14. Outer surfaces B and B' and transverse surfaces C and C' and D and D' can be obtained by polishing and etching and can be examined at a magnification of one hundred times by light optical microscopy. The surfaces can be polished in a two-step sequence using a first paste containing 0.6 micron diamond dust and a second aqueous paste containing 0.3 micron aluminum oxide particles. The surfaces are then carefully cleaned of any paste residue and are etched in a solution containing equal parts of benzene, xylene and chloroform heated to a temperature of about 80° C. (175° F.) Three to four minutes are required to etch the surfaces of sample A and five to six minutes to etch the surfaces of sample A'. The surfaces B, D and D of cube A are comprised of substantially non-oriented spherulitic crystalline aggregates as shown. It is generally recognized that the crystalline aggregates grow radially from nuclei and are referred to as spherulites. The spherulitic crystalline aggregates appear as generally polygonal in shape on polished faces While the structure of the polymer is predominantly crystalline in nature, small areas of non-crystalline or amorphous structures become entrapped in and between the spherulites during their growth.

The surface B' shows a structure comprised of spherulitic crystalline aggregates which are discrete platelets generally polygonal in shape. The surfaces C' and D' show the aggregates to be radially compressed into relatively thin lamellae, elongated in both the circumferential and axial directions, and oriented in the plane of the conduit wall, i.e., oriented circumferentially and axially. No evidence of microvoids or enlargement of existing microvoids is seen in the sheet.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An apparatus for producing biaxially oriented polymer sheet from a workpiece of semi-crystalline polymer material having inboard and outboard portions, wherein the workpiece has a first lateral dimension extending in a first lateral direction; a second lateral dimension oriented in a direction normal to the first lateral dimension and extending in a second lateral direction, and a longitudinal dimension extending in a longitudinal direction normal to both first and second lateral dimensions, the apparatus comprising:
   means for applying a force to the workpiece in the longitudinal direction to move the workpiece from an upstream position to a downstream position;
   means for confining the workpiece while the force is applied, wherein the material of the workpiece flows in directions having components parallel to the first and second lateral dimensions and parallel to the longitudinal dimension of the workpiece, the confining means including rigid surfaces which converge toward one another in a direction parallel to the first lateral dimension of the workpiece while expanding in a direction parallel to the second lateral dimension of the workpiece, the rigid surfaces terminating to define an outlet opening having a rectangular cross-section; the rigid surfaces which converge toward one another having rigid protrusion means thereon for squeezing inboard portions of the workpiece more than outboard portions, and means for maintaining a continuous convex surface while the material is confined; whereby the material of the workpiece flows bidirectionally to produce the biaxially oriented polymer sheet.

2. The apparatus of claim 1 further including means for restraining the flat polymer sheet in a flat configuration while the sheet is allowed to cool.

3. The apparatus of claim 1, wherein the means for confining the workpiece is a die having opposed rigid inner working surfaces extending from the upstream position toward the downstream position, which rigid working surfaces converge in the first lateral direction and diverge in the second lateral direction from upstream to downstream and wherein the rigid working surfaces of the die which converge toward one another include the rigid protrusion means thereon.

4. The apparatus of claim 3 wherein the protrusion means is convex in configuration.

5. The apparatus of claim 4 further including means for restraining the flat polymer sheet in a flat configuration while the sheet is allowed to cool.

6. The apparatus of claim 1, wherein the means for confining the workpiece comprises a pair of opposed tensioned belts supported by pairs of opposed rigid rollers having convex rigid surfaces, wherein the convex rigid surfaces have a convexity which decreases in the downstream direction; the opposed belts minimizing rebounding of the material of the workpiece between adjacent pairs of opposed rigid rollers.

7. The apparatus of claim 6 further including means for restraining the flat polymer sheet in a flat configuration while the sheet is allowed to cool.

* * * * *